US008177501B2

(12) United States Patent
Flanagan

(10) Patent No.: US 8,177,501 B2
(45) Date of Patent: May 15, 2012

(54) STATOR CASING HAVING IMPROVED RUNNING CLEARANCES UNDER THERMAL LOAD

(75) Inventor: Mark W. Flanagan, Greenville, SC (US)

(73) Assignee: General Electric Company, Schenectady, NY (US)

( * ) Notice: Subject to any disclaimer, the term of this patent is extended or adjusted under 35 U.S.C. 154(b) by 745 days.

(21) Appl. No.: 12/350,386

(22) Filed: Jan. 8, 2009

(65) Prior Publication Data

US 2010/0172754 A1 Jul. 8, 2010

(51) Int. Cl.

| | |
|---|---|
| ***F01D 1/02*** | (2006.01) |
| ***F01D 9/00*** | (2006.01) |
| ***F03B 1/00*** | (2006.01) |
| ***F03B 11/02*** | (2006.01) |
| ***F03B 3/16*** | (2006.01) |
| ***F03D 1/04*** | (2006.01) |
| ***F03D 3/04*** | (2006.01) |
| ***F03D 5/00*** | (2006.01) |
| ***F04D 29/44*** | (2006.01) |
| ***F04D 29/54*** | (2006.01) |

(52) U.S. Cl. .................................................... 415/208.2

(58) Field of Classification Search ................ 415/208.2
See application file for complete search history.

(56) References Cited

U.S. PATENT DOCUMENTS

| | | | | |
|---|---|---|---|---|
| 2,634,090 | A * | 4/1953 | Hardigg | 415/135 |
| 5,167,488 | A * | 12/1992 | Ciokajlo et al. | 415/175 |
| 6,733,233 | B2 * | 5/2004 | Jasklowski et al. | 415/135 |

* cited by examiner

*Primary Examiner* — David S Blum
(74) *Attorney, Agent, or Firm* — Sutherland Asbill & Brennan LLP

(57) ABSTRACT

A turbine power generation system, comprising a stator including a shroud and a rotor rotatably situated within the shroud, wherein the shroud is structured such that the inner diameter of the inner surface of the shroud reduces when the inner surface is exposed to a thermal load. The reduction of the inner diameter allows a minimum blade-casing clearance to be achieved during steady-state operation instead of during transient operations. Blade-casing clearance is configured to be greatest at when the engine is in a cold, stationary position. The clearance is further configured to decrease as thermal load increases until a steady-state, thermal equilibrium is achieved. The clearance grows during shutdown as the stator and rotor begin to cool.

20 Claims, 7 Drawing Sheets

STATOR CASING HAVING IMPROVED RUNNING CLEARANCES UNDER THERMAL LOAD

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is generally in the field of gas turbine power generation systems. More particularly, the present invention is directed to a stator casing having improved running clearances under thermal load.

Combustion turbines are often part of a power generation unit. The components of such power generation systems usually include the turbine, a compressor, and a generator. These components are mechanically linked, often employing multiple shafts to increase the unit's efficiency. The generator is generally a separate shaft driven machine. Depending on the size and output of the combustion turbine, a gearbox is sometimes used to couple the generator with the combustion turbine's shaft output.

Generally, combustion turbines operate in what is known as a Brayton Cycle. The Brayton cycle encompasses four main processes: compression, combustion, expansion, and heat rejection. Air is drawn into the compressor, where it is both heated and compressed. The air then exits the compressor and enters a combustor, where fuel is added to the air and the mixture is ignited, thus creating additional heat. The resultant high-temperature, high-pressure gases exit the combustor and enter a turbine, where the heated, pressurized gases pass through the vanes of the turbine, turning the turbine wheel and rotating the turbine shaft. As the generator is coupled to the same shaft, it converts the rotational energy of the turbine shaft into usable electrical energy.

The efficiency of a gas turbine engine depends in part on the clearance between the tips of the rotor blades and the inner surfaces of the stator casing. This is true for both the compressor and the turbine. As clearance increases, more of the engine air passes around the blade tips of the turbine or compressor and the casing without producing useful work, decreasing the engine's efficiency. Too small of a clearance results in contact between the rotor and stator in certain operating conditions.

Because the stator and rotor are exposed to different thermal loads and are commonly made of different materials and thicknesses, the stator and rotor expand and shrink differing amounts during operations. This results in the blade and casing having a clearance that varies with the operating condition. The thermal response rate mismatch is most severe for many gas turbine engines during shutdown. This is because rotor purge circuits do not have a sufficient pressure difference to drive cooling flow. This results in a stator casing that cools down much faster than the rotor. Due to thermal expansion, the casing shrinks in diameter faster than the rotor. If a restart is attempted during the time when the casing is significantly colder than the rotor, the mechanical deflection caused by the rotation of the rotor increases the diameter of the rotor, closing the clearance between the rotating and stationary parts (a condition known as "restart pinch").

Typically, the cold clearance (the clearance in the cold, stationary operational condition) between the blade and the casing is designed to minimize tip clearance during steady-state operations and to avoid tip rubs during transient operations such as shutdown and startup. These two considerations must be balanced in the cold clearance design, but a transient operating condition usually determines the minimum cold build clearance. As such, the steady state blade clearance is almost always greater than the minimum clearance possible.

BRIEF SUMMARY OF THE INVENTION

In one aspect, the present invention comprises a turbine power generation system, comprising a stator including a shroud and a rotor rotatably situated within the shroud, wherein the shroud is structured such that the inner diameter of the inner surface of the shroud reduces when the inner surface is exposed to a thermal load.

In another aspect, the present invention comprises a turbine power generation system, comprising a shroud including a plurality of leaves in which each of the leaves are attached to the stator and comprise a strip of material wrapping angularly about the axis of rotation of the rotor.

In yet another aspect, the present invention comprises a method for improving efficiency of a gas turbine engine comprising the steps of: (1) providing a shroud for the stator; (2) firing the gas turbine engine to produce heat within the shroud; and (3) applying the heat produced by the gas turbine engine to the shroud so as to reduce the inner diameter of the shroud.

DETAILED DESCRIPTION OF THE INVENTION

Figure 1:
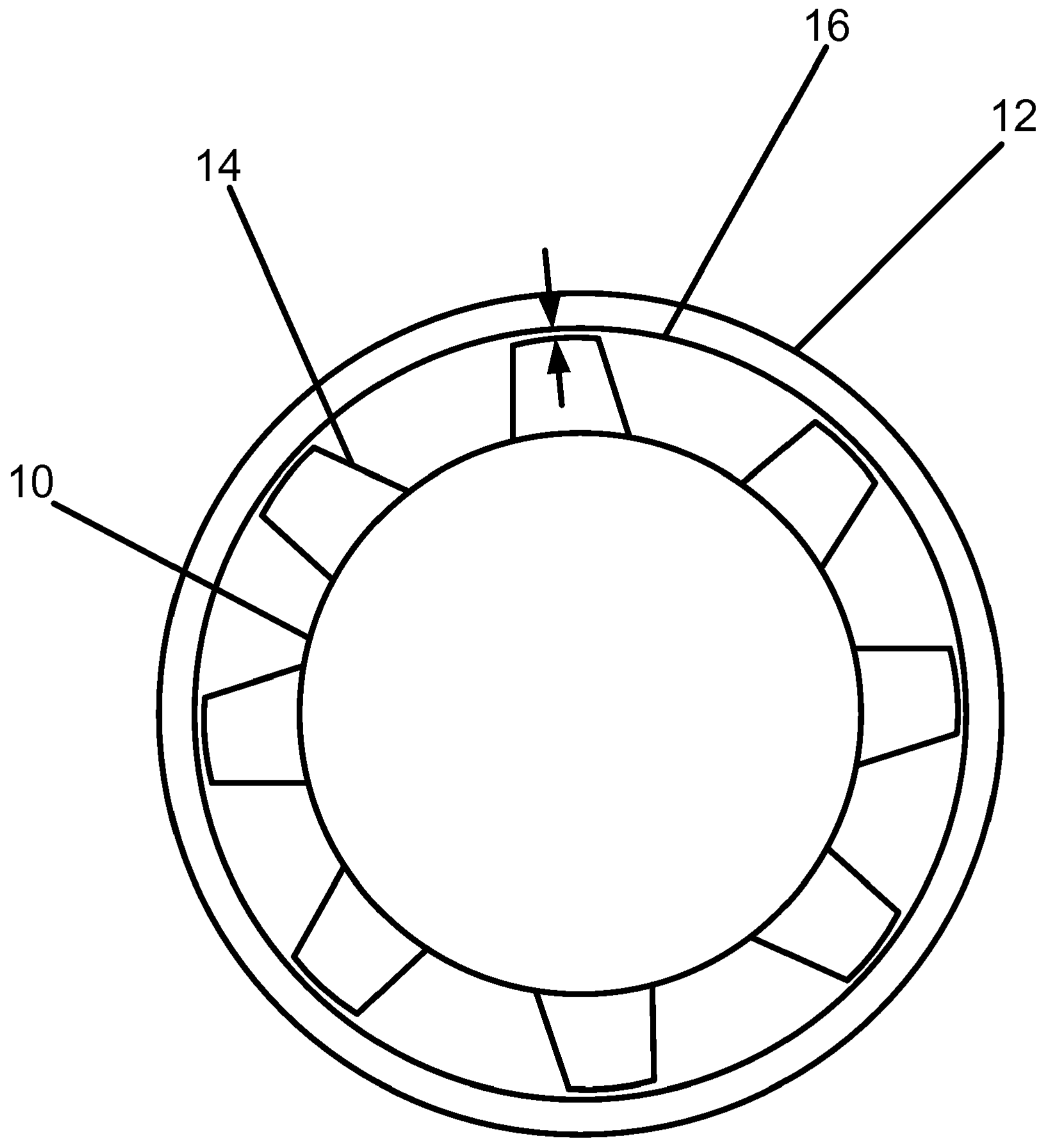
FIG. 1 (Prior Art)
FIG. 1 is a schematic depiction of a rotor and a stator.

FIG. 1 is a depiction of a simplified rotor situated within a stator casing. The rotor 10 includes a plurality of blades 14 which are circumferentially situated about the rotor 10. The blades 14 extend in a radial direction from the axis of rotation of the rotor 10 toward the inner surface 16 of the casing of the stator 12. The portion of the blade 14 closest to the inner surface 16 is referred to as the "tip." The clearance between the blade 14 and the inner surface 16 is illustrated by the arrows in FIG. 1. As explained previously, the greatest efficiency is achieved when operating at minimal clearance. This clearance changes as the turbine undergoes transient operations because of the differing thermal response rates of the stator 12 and the rotor 10.

Once a turbine is fired, rotation of the rotor 10 causes mechanical deflection of the blades 14 as rotational forces pull the blades 14 towards the inner surface 16. As thermal loads are applied, the rotor 10 and the stator 12 gain heat and the rotor and stator materials expand. Before the stator 12 reaches a thermal equilibrium, the stator 12 continues to expand, pulling the inner surface 16 further away from the blades 14. Thus, minimal clearance typically occurs at a time before or after achieving steady-state operating conditions, and steady-state operation is performed at a clearance greater than the minimal clearance.

Figure 6:
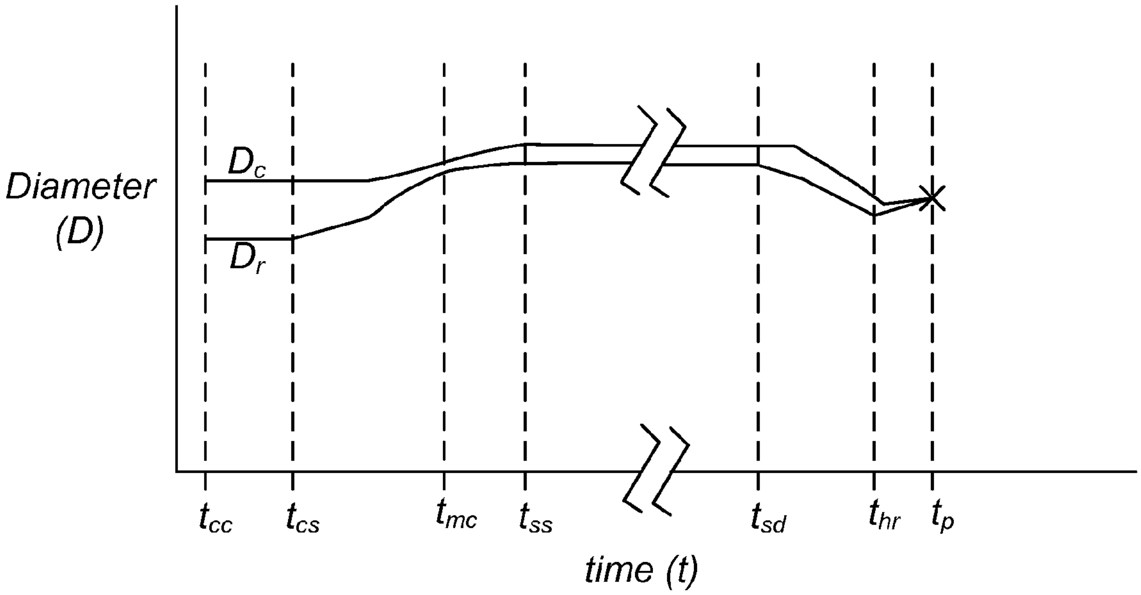
FIG. 6 is a graph, illustrating the change in the clearance between a rotor and stator over time.

FIG. 6 is illustrative of a common operating process for a gas turbine engine employing the stator-rotor configuration of FIG. 1. The top line in the graph, $D_c$, indicates the diameter of the inner surface 16 of the casing 12 during transient and steady-state operations. The bottom line, $D_r$, represents the change in diameter of the outer tip of the blade 14 of the rotor 10 during transient and steady-state operations. At time $t_{cs}$ the rotor 10 is cold and stationary. The "cold clearance" is represented by the separation between $D_c$ and $D_r$ at time $t_{cs}$. At time $t_{cs}$ a cold start is initiated. $D_r$ immediately begins to increase as the rotation of the rotor 10 causes mechanical deflection of the blades 14. Transient operations continue as the gas turbine engine warms to a steady-state thermal equilibrium. During this period of transient operations, the casing 12 and the rotor 10 expand at different rates as they are subjected to thermal loads. At time $t_{mc}$ a minimal clearance is achieved as the rotor 10 is gaining heat and expanding more quickly than casing 12. Conventionally, this minimal clearance is a design limitation that must be considered when designing cold build tolerances.

Later, at time $t_{ss}$, a steady-state operating condition is achieved and $D_r$ and $D_c$ remain substantially unchanged. Shut down operations are instituted at time $t_{sd}$. At this time, reduced rotational speed of the rotor 10 causes reduced mechanical deflection of the blades 14. The casing 12 begins to cool at a faster rate than the rotor 10 causing the clearance to decrease. At time $t_{hr}$ a hot restart is initiated. This causes increased mechanical deflection of the rotor 10 and an increased thermal expansion of the rotor 10. At time $t_p$ a pinch condition occurs as $D_r$ increases at a faster rate than $D_c$. Like the minimal clearance occurring at time $t_{mc}$ the restart pinch condition is also a design limitation that must be considered when designing cold build tolerances.

In one aspect, the present invention comprises a stator casing for a turbine power generation system having an inner diameter which reduces under thermal load. The reduction of the inner diameter allows a minimum blade-casing clearance to be achieved during steady-state operation instead of during transient operations. In one embodiment, blade-casing clearance is configured to be greatest at when the engine is in a cold, stationary position. The clearance is further configured to decrease as thermal load increases until a steady-state, thermal equilibrium is achieved. In this embodiment, the clearance grows during shutdown as the stator and rotor begin to cool. In one aspect, the present invention comprises a spiral leaf casing situated within a stator housing. When subjected to a thermal load, the leaves grow in length causing the inner diameter of the casing to decrease in size thereby reducing the clearance between the rotor blade and the spiral leaf casing.

Figure 2:
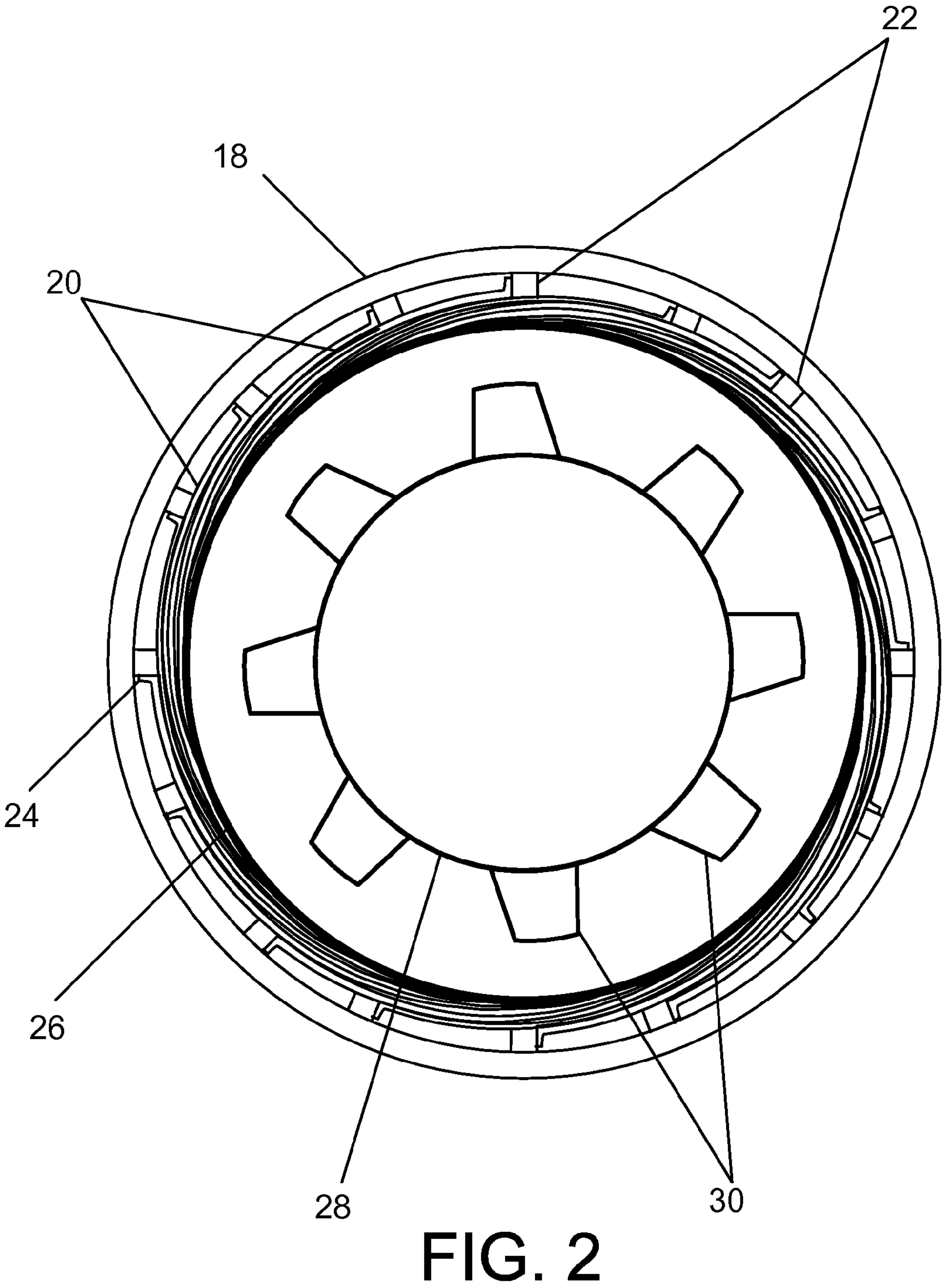
FIG. 2 is a schematic depiction of an embodiment of the present invention before a thermal load is applied.

FIG. 2 illustrates an embodiment of the present invention. The rotor 28, having a plurality of blades 30, rotates angularly about an axis of rotation within the stator 18. The stator 18 includes a shroud comprising a plurality of overlapping leaves 20. Each leaf 20 wraps angularly about the axis of rotation of the rotor 28. Each leaf 20 has a first end 24 which is attached to the housing of the stator 18. The other end of the leaf 20 defines part of the inner surface 26 of the shroud. FIG. 2 illustrates a gas turbine engine prior to thermal loading. In the present illustration, the engine is at a "cold" state.

Figure 3:
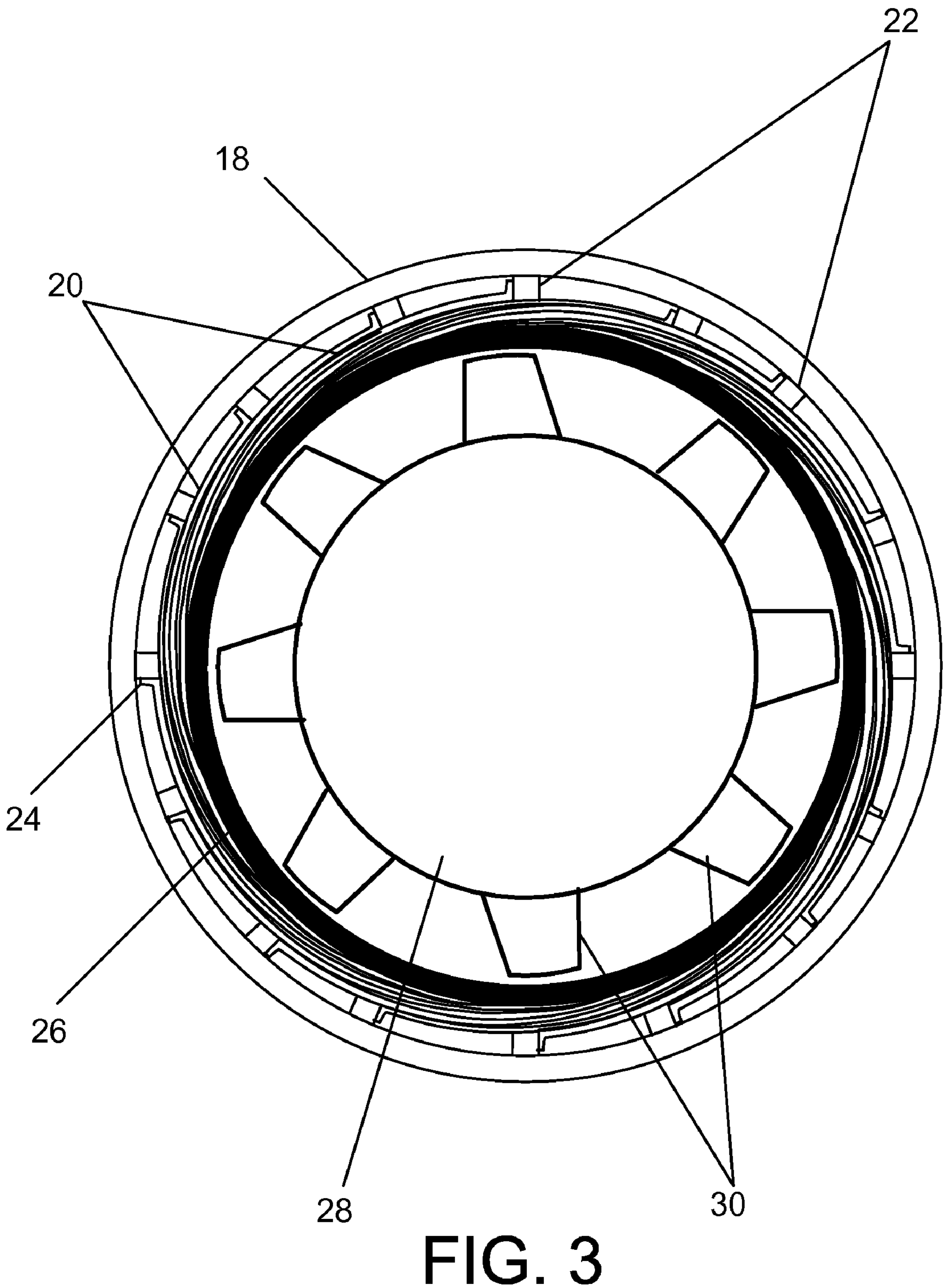
FIG. 3 is a schematic depiction of the embodiment of FIG. 2 after a thermal load has been applied.

Turning to FIG. 3, the rotor 28 and the stator 18 are illustrated as they might appear during steady-state operation. As the rotor 28 and the stator 18 are heated, the clearance between the blade 30 and the inner surface 26 of the shroud decreases. The diameter of the rotor 28 measured between the tips of two diametrically-opposed blades 30 increases because of mechanical deflection and material expansion. The leaves 20 of the shroud also expand and grow in length. Although the housing of the rotor 18 enlarges and pulls away from the rotor 28 as it warms, the expansion of the leaves 20 compensates for the enlargement, pushing the inner surface 26 of the shroud towards the blades 30. At steady-state operation, a thermal equilibrium is achieved. At this point, a constant clearance is maintained between the tips of the blades 30 and the inner surface 26 of the shroud.

When the turbine engine is shut down, the rotor 28 and the stator 18 transition back to the state illustrated in FIG. 2. During shut down operations, the rotor 28 and blades 30 cool causing the rotor and blade material to shrink. The slower rotation of the rotor 28 also causes less mechanical deflection of the blades 30. The leaves 20 also cool and reduce in size. This causes the inner surface 26 to pull away from the rotor 28 even though the cooling of the housing of the stator 18 causes the housing to return to its original, cold size.

In another embodiment of the present invention. The leaves 20 are designed more particularly to expand at such a rate to match and offset the enlargement of the housing such that a constant or near constant inner diameter of the inner surface 26 is maintained between start-up and steady-state operating conditions. In this example, the clearance between the tips of blades 30 and inner surface 26 decreases as the engine transitions from a start-up operating condition to a steady-state operating condition and increases as the engine transitions from the steady-state operating condition to a shutdown operating condition. The inner diameter of inner surface 26 remains substantially the same throughout the process because the leaves 20 expand to compensate for the enlargement of the housing of stator 18.

Figure 4:
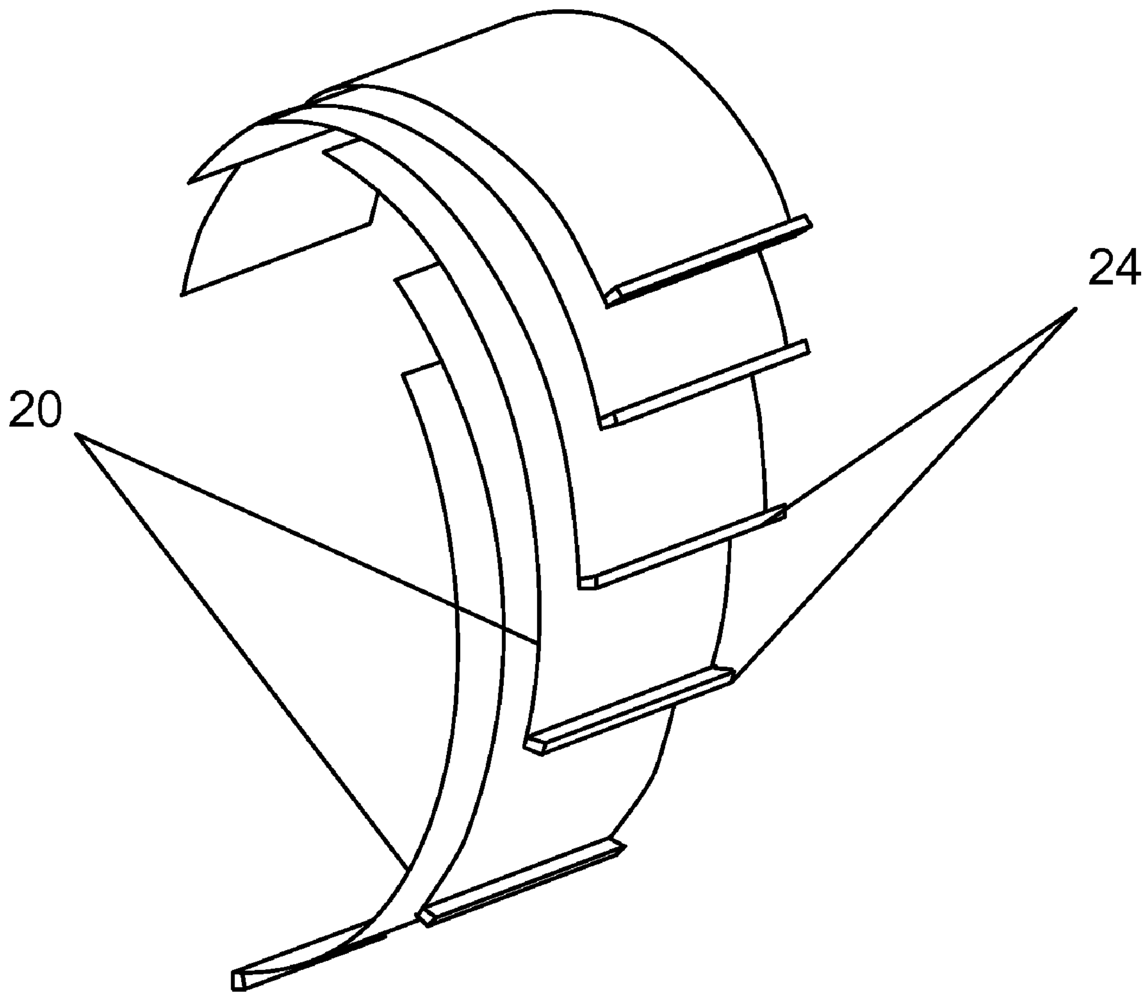
FIG. 4 is a perspective view of a portion of a spiral leaf casing.

FIG. 4 illustrates a portion of a spiral leaf casing removed from the stator housing. In the present example, six leaves 20 are shown. Each leaf 20 includes a strip of material with a flange at the first end 24. The second end of each leaf 20 forms part of the inner surface of the shroud. The strip of material wraps around the center axis of rotation of the turbine and is "sandwiched" between adjacent leaves. Many different materials could be selected for leaves 20; however, it is desirable to select a material that has a relatively high coefficient of linear and/or volumetric thermal expansion and a high melting point since the material is exposed to the hot gas path of the gas turbine.

Figure 5:
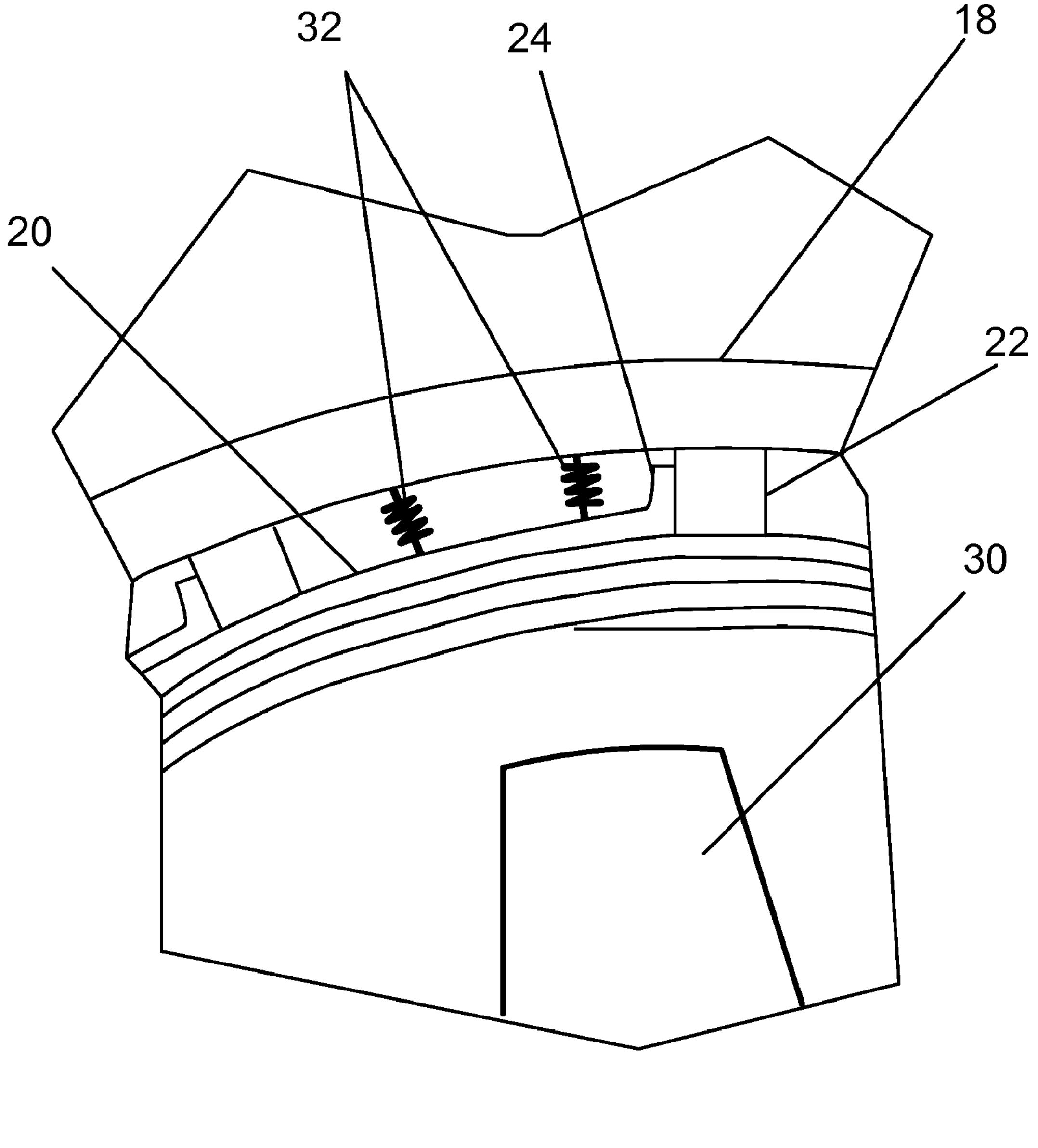
FIG. 5 is a detail view illustrating the attachment of a spiral leaf casing to a housing in an embodiment of the present invention.

FIG. 5 is a detail view illustrating an embodiment of the present invention. In this embodiment, the flange on the end 24 of the leaf 20 mates with stop 22 of the stator 18. As such, when the leaf 20 undergoes linear thermal expansion, the other end of the leaf extends further about the axis of rotation of the turbine. The leaf 20 also undergoes volumetric thermal expansion when subjected to a heat load, causing the thickness of leaf 20 to increase. Thus, both the linear and volumetric expansion of leaf 20 causes the inner diameter of the shroud to move in the direction of the tip of the blades 30 when the turbine warms to steady-state operating conditions. Springs 32 are used to secure the leaves 20 to the stator 18.

Figure 7:
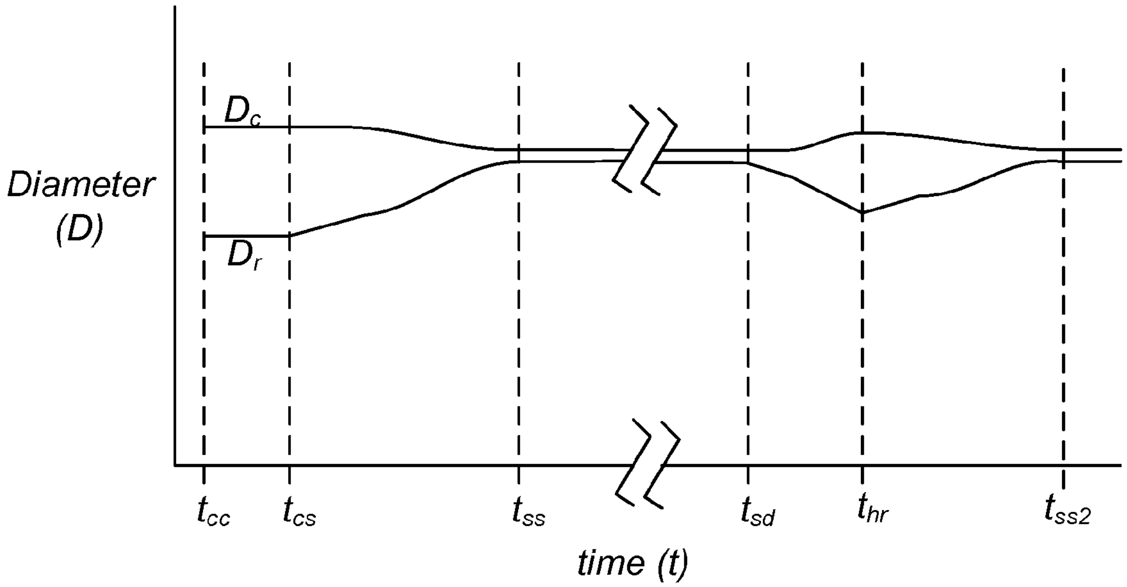
FIG. 7 is a graph, illustrating the change in the clearance between a rotor and stator over time when the stator employs a casing having an inner diameter which reduces under thermal load.

FIG. 7 is illustrative of a common operating process for a gas turbine engine employing the spiral leaf shroud of FIGS. 2-5. Diameter $D_r$ of the rotor 10 changes with time substantially the same as in the embodiment of FIG. 1 as illustrated in FIG. 6. Diameter $D_c$ of the inner surface 26 in the embodiment of FIGS. 2-5 behaves differently than the Diameter $D_c$ of the embodiment of FIG. 1. At time $t_{cs}$ a cold start is initiated. $D_r$ immediately begins to increase as the rotation of the rotor 10 causes mechanical deflection of the blades 14. Transient operations continue as the gas turbine engine warms to a steady-state thermal equilibrium. During this period of transient operations, the inner surface 26 of the stator reduces as the leaves 20 undergo thermal expansion. The clearance between $D_c$ and $D_r$ continues to decrease until time $t_{ss}$, when a steady-state operating condition is achieved and $D_r$ and $D_c$ remain substantially unchanged.

Shut down operations are instituted at time $t_{sd}$. At this time, reduced rotational speed of the rotor 10 causes reduced mechanical deflection of the blades 14. The leaves 20 begin to cool and shrink causing the clearance to increase. At time $t_{hr}$ a hot restart is initiated. This causes increased mechanical deflection of the rotor 10 and an increased thermal expansion of the rotor 10. No pinch condition occurs and a steady-state condition is once again achieved at $t_{ss2}$. The reader will note that minimal clearance is achieved during steady-state operation. Since clearances grow during shut down operations, it can be seen that employing a stator having a reducing inner diameter eliminates some of the design limitations that normally influence the hot-running clearances of the turbine. As such, smaller hot-running clearances may be achieved in employing the present invention.

The present invention comprises a stator casing for a turbine power generation system having an inner diameter which reduces under thermal load. The reduction of the inner diameter allows a minimum blade-casing clearance to be achieved during steady-state operation instead of during transient operations. In one embodiment, blade-casing clearance is configured to be greatest at when the engine is in a cold, stationary position. The clearance is further configured to decrease as thermal load increases until a steady-state, thermal equilibrium is achieved. In this embodiment, the clearance grows during shutdown as the stator and rotor begin to cool. In one aspect, the present invention comprises a spiral leaf casing situated within a stator housing. When subjected to a thermal load, the leaves grow in length and volume causing the inner diameter of the casing to decrease in size thereby reducing the clearance between the rotor blade and the spiral leaf casing.

The invention is not limited to the specific embodiments disclosed above. Modifications and variations of the methods and devices described herein will be obvious to those skilled in the art from the foregoing detailed description. Such modifications and variations are intended to come within the scope of the appended claims.

I claim:

1. A turbine power generation system, comprising:

a stator including a shroud, the shroud having an inner surface, the inner surface having an inner diameter; and a rotor rotatably situated within the shroud, the rotor adapted to rotate about an axis of rotation, the rotor having a blade, the blade having a tip proximal to the inner surface of the shroud;

wherein the shroud is structured such that the shroud expands circumferentially and thereby reduces the inner diameter of the inner surface when the inner surface is exposed to a thermal load.

2. The turbine power generation system of claim 1, wherein the shroud is contained within a housing, the housing having an inner surface facing the shroud.

3. The turbine power generation system of claim 1, wherein the shroud comprises a plurality of leaves, each of the leaves attached to the stator and having a first end occupying a portion of the inner surface.

4. The turbine power generation system of claim 2, wherein the shroud comprises a plurality of leaves, each of the leaves attached to the stator and having a first end occupying a portion of the inner surface.

5. The turbine power generation system of claim 4, wherein each of the leaves is attached to the stator at a second end.

6. The turbine power generation system of claim 5, wherein each of the leaves comprises a strip of material extending between the first end and the second end, the strip of material wrapping angularly about the axis of rotation of the rotor.

7. The turbine power generation system of claim 6, wherein each of the leaves is configured to lengthen when subjected to a thermal load and thereby reduce the inner diameter of the inner surface.

8. The turbine power generation system of claim 6, wherein each of the leaves is configured to expand in volume when subjected to a thermal load and thereby reduce the inner diameter of the inner surface.

9. A turbine power generation system, comprising:

a stator including a housing and a shroud contained within the housing, the shroud having an inner surface, the inner surface having an inner diameter that is reducible by a circumferential expansion of the shroud; and a rotor rotatably situated within the shroud, the rotor adapted to rotate about an axis of rotation, the rotor having a blade, the blade having a tip proximal to the inner surface of the shroud;

wherein the shroud comprises a plurality of leaves, each of the leaves attached to the stator and comprising a strip of material extending between a first end and a second end, the strip of material wrapping angularly about the axis of rotation of the rotor.

10. The turbine power generation system of claim 9, wherein a portion of each of the leaves proximal to the first end occupies and defines a portion of the inner surface of the shroud.

11. The turbine power generation system of claim 9, wherein the inner diameter of the inner surface is adapted to reduce when the inner surface is exposed to a thermal load.

12. The turbine power generation system of claim 9, wherein each of the leaves is attached to the stator at the second end.

13. The turbine power generation system of claim 9, wherein each of the leaves is configured to lengthen when subjected to a thermal load and thereby reduce the inner diameter of the inner surface.

14. The turbine power generation system of claim 9, wherein each of the leaves is configured to expand in volume when subjected to a thermal load and thereby reduce the inner diameter of the inner surface.

15. A method for altering efficiency of a gas turbine engine having a rotor and a stator comprising the steps of:

providing a shroud for the stator, the shroud having an inner surface facing the rotor, the inner surface having an inner diameter;

firing the gas turbine engine to produce heat within the shroud; and applying the heat produced by the gas turbine engine to the shroud so as to expand the shroud circumferentially and thereby reduce the inner diameter of the shroud.

16. The method of claim 15, wherein the shroud is contained within a housing of the stator, the housing having an inner surface facing the shroud.

17. The method of claim 15, wherein the shroud comprises a plurality of leaves, each of the leaves attached to the stator and having a first end occupying a portion of the inner surface.

18. The method of claim 17, wherein each of the leaves is attached to the stator at a second end.

19. The method of claim 18, wherein each of the leaves comprises a strip of material extending between the first end and the second end, the strip of material wrapping angularly about the axis of rotation of the rotor.

20. The method of claim 17, wherein each of the leaves is configured to lengthen or expand in volume when subjected to a thermal load and thereby reduce the inner diameter of the inner surface.

* * * * *